US008783061B2

(12) United States Patent  
Coward

(10) Patent No.: US 8,783,061 B2  
(45) Date of Patent: Jul. 22, 2014

(54) APPARATUS AND METHOD FOR OPTIMIZING A NATURAL GAS LIQUEFACTION TRAIN HAVING A NITROGEN COOLING LOOP

(75) Inventor: Brian A. Coward, Southhampton (GB)

(73) Assignee: Honeywell International Inc., Morristown, NJ (US)

( * ) Notice: Subject to any disclaimer, the term of this patent is extended or adjusted under 35 U.S.C. 154(b) by 1135 days.

(21) Appl. No.: 11/811,782

(22) Filed: Jun. 12, 2007

(65) Prior Publication Data

US 2008/0307826 A1    Dec. 18, 2008

(51) Int. Cl.
*F25J 1/00*      (2006.01)

(52) U.S. Cl.
USPC .................................. 62/612; 62/611; 62/614

(58) Field of Classification Search
USPC ............................................ 62/611, 612, 614
See application file for complete search history.

(56) References Cited

U.S. PATENT DOCUMENTS

| | | | | |
|---|---|---|---|---|
| 5,139,548 | A * | 8/1992 | Liu et al. ........................... | 62/611 |
| 5,791,160 | A * | 8/1998 | Mandler et al. .................. | 62/611 |
| 6,272,882 | B1 * | 8/2001 | Hodges et al. ................... | 62/613 |
| 6,662,589 | B1 * | 12/2003 | Roberts et al. ................... | 62/425 |
| 6,725,688 | B2 * | 4/2004 | Elion et al. ....................... | 62/612 |
| 6,789,394 | B2 * | 9/2004 | Elion et al. ....................... | 62/612 |
| 2004/0255615 | A1 * | 12/2004 | Hupkes et al. ................... | 62/606 |
| 2005/0005635 | A1 * | 1/2005 | Le Metais ........................ | 62/612 |
| 2005/0155381 | A1 * | 7/2005 | Yang et al. ....................... | 62/620 |
| 2007/0227187 | A1 | 10/2007 | Coward | |
| 2007/0275471 | A1 | 11/2007 | Coward | |
| 2007/0276542 | A1 | 11/2007 | Coward | |

FOREIGN PATENT DOCUMENTS

| | | |
|---|---|---|
| EP | 0 252 455 A2 | 1/1988 |
| WO | WO 99/31448 A1 | 6/1999 |
| WO | WO 2004/068049 A1 | 8/2004 |

OTHER PUBLICATIONS

Firmin Butoyi, U.S. Appl. No. 11/770,142, filed Jun. 28, 2007, "Multivariable Process Controller and Methodology for Controlling a Catalyzed Chemical Reaction to Form Phthalic Anhydride and Other Functionalized Aromatics."
Paul S. Fountain, U.S. Appl. No. 11/708,957, filed Feb. 21, 2007, "Apparatus and Method for Optimizing a Liquefied Natural Gas Facility."
U.S. Appl. No. 11/708,957, filed Feb. 21, 2007, Paul S. Fountain, "Apparatus and Method for Optimizing a Liquefied Natural Gas Facility."
European Patent Application No. 06123685.7, filed Nov. 8, 2006, "A Process of Liquefying a Gasoline Methane-Rich Feed for Obtaining Liquid Natural Gas."
Notification of Transmittal of the International Search Report and the Written Opinion of the International Searching Authority, or the Declaration dated Feb. 15, 2012 in connection with International Patent Application No. PCT/US2008/066252.

* cited by examiner

*Primary Examiner* — Mohammad M Ali
*Assistant Examiner* — Keith Raymond

(57) ABSTRACT

A natural gas liquefaction train includes a nitrogen cooling loop. A controller is provided for controlling one or more controlled variables by adjusting one or more manipulated variables. The one or more manipulated variables may include a nitrogen flow associated with the nitrogen cooling loop in the natural gas liquefaction train. The controller could adjust the nitrogen flow by adjusting operation of a compressor associated with the nitrogen cooling loop. The one or more controlled variables may include a rundown temperature of liquefied natural gas exiting the nitrogen loop and/or a calorific or heating value of the liquefied natural gas exiting the nitrogen loop. A second controller could control other aspects of the natural gas liquefaction train, such as by controlling a mass flow rate of a feed gas in the natural gas liquefaction train.

23 Claims, 4 Drawing Sheets

APPARATUS AND METHOD FOR OPTIMIZING A NATURAL GAS LIQUEFACTION TRAIN HAVING A NITROGEN COOLING LOOP

TECHNICAL FIELD

This disclosure relates generally to control systems and more specifically to an apparatus and method for optimizing the operation of a natural gas liquefaction train having a nitrogen cooling loop.

BACKGROUND

A liquefied natural gas facility typically converts feed gas into liquefied natural gas (LNG). For example, a liquefied natural gas facility may include equipment to cool a natural gas feed to produce liquefied natural gas. The liquefied natural gas occupies far less space than natural gas, which may allow for more economic shipment of the natural gas. Control of a liquefied natural gas facility is often difficult due to various factors, such as the large number of process variables that affect the operation of the facility. Human operators may make periodic adjustments to key operating variables of the liquefied natural gas facility. However, this manual control is often sub-optimal, resulting in a loss of production and a corresponding monetary loss.

SUMMARY

This disclosure provides an apparatus and method for optimizing the operation of a natural gas liquefaction train having a nitrogen cooling loop.

In a first embodiment, an apparatus includes at least one memory configured to store at least one model. The at least one model is associated with one or more manipulated variables and one or more controlled variables. The one or more manipulated variables and the one or more controlled variables are associated with a natural gas liquefaction train. The apparatus also includes at least one processor configured to determine how to adjust the one or more manipulated variables using the at least one model so as to control the one or more controlled variables. At least one of the one or more manipulated variables and at least one of the one or more controlled variables are associated with a nitrogen cooling loop in the natural gas liquefaction train.

In particular embodiments, the one or more manipulated variables include a nitrogen flow associated with the nitrogen cooling loop in the natural gas liquefaction train.

In other particular embodiments, the at least one processor is configured to adjust operation of a compressor associated with the nitrogen cooling loop to adjust the nitrogen flow. For example, the at least one processor may be configured to adjust at least one of a speed and a suction pressure of the compressor.

In yet other particular embodiments, the one or more controlled variables include a rundown temperature of liquefied natural gas exiting the nitrogen loop and/or a calorific or heating value of the liquefied natural gas exiting the nitrogen loop.

In a second embodiment, a method includes determining how to adjust one or more manipulated variables so as to control one or more controlled variables. The one or more manipulated variables and the one or more controlled variables are associated with a natural gas liquefaction train. The method also includes outputting control signals for adjusting operation of a nitrogen cooling loop in the natural gas liquefaction train based on the determination.

In a third embodiment, a computer program is embodied on a computer readable medium. The computer program includes computer readable program code for determining how to adjust one or more manipulated variables so as to control one or more controlled variables. The one or more manipulated variables and the one or more controlled variables are associated with a natural gas liquefaction train. The computer program also includes computer readable program code for adjusting operation of a nitrogen cooling loop in the natural gas liquefaction train based on the determination.

In a fourth embodiment, a system includes a plurality of controllers configured to control operation of a natural gas liquefaction train. A first of the controllers is configured to determine how to adjust one or more manipulated variables associated with the natural gas liquefaction train so as to control one or more controlled variables associated with the natural gas liquefaction train. At least one of the one or more manipulated variables and at least one of the one or more controlled variables are associated with a nitrogen cooling loop in the natural gas liquefaction train.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
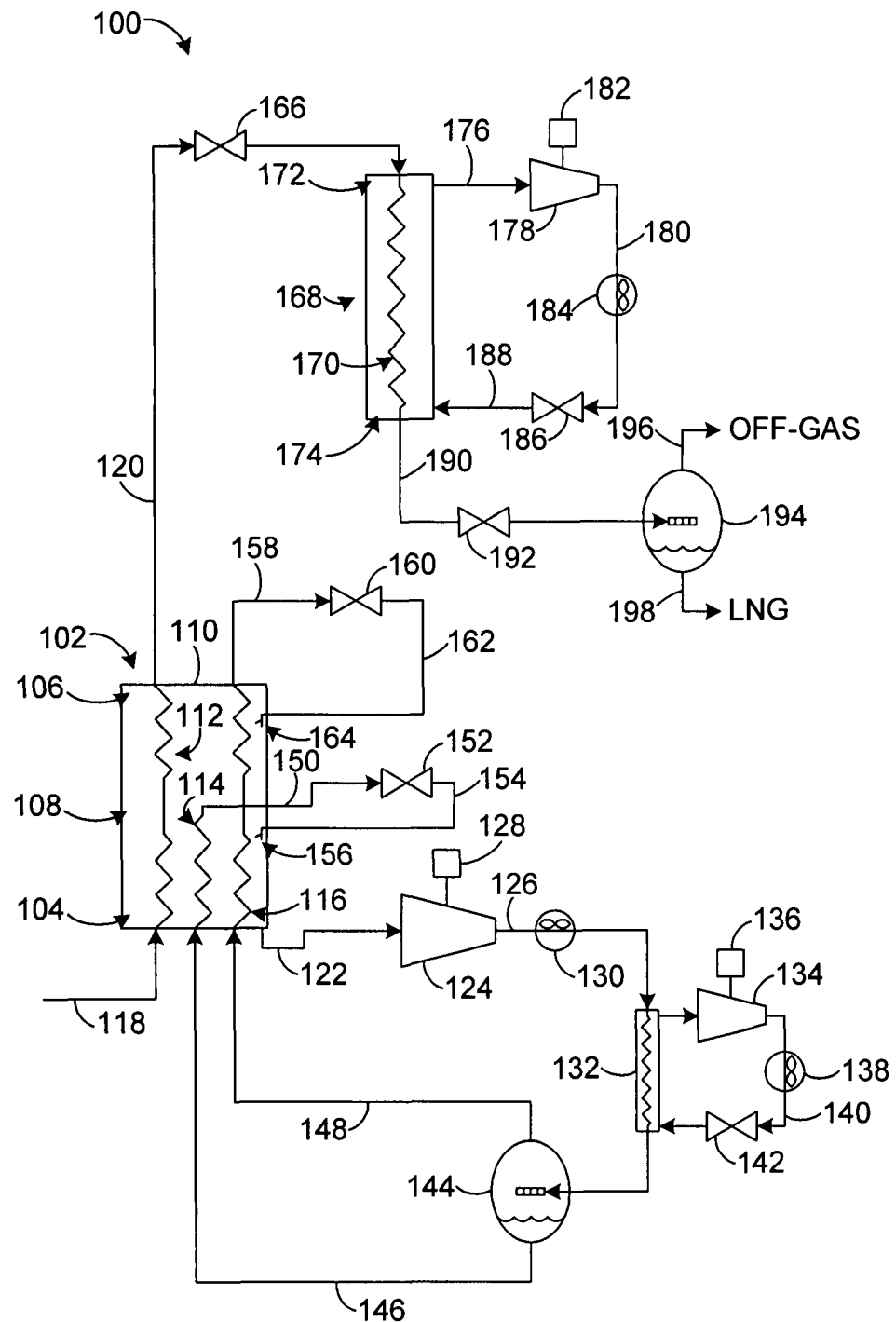
FIG. 1 illustrates an example natural gas liquefaction train in accordance with this disclosure.

FIG. 1 illustrates an example natural gas liquefaction train 100 in accordance with this disclosure. The embodiment of the natural gas liquefaction train 100 shown in FIG. 1 is for illustration only. Other embodiments of the natural gas liquefaction train 100 may be used without departing from the scope of this disclosure.

In this example embodiment, the natural gas liquefaction train 100 includes equipment for processing a methane-rich feed gas (natural gas) to produce liquefied natural gas (LNG). The equipment shown in FIG. 1 represents one possible implementation of a natural gas liquefaction train. Other types of natural gas liquefaction trains or facilities having other or additional equipment or having equipment in a different configuration could also be used.

In this example, the natural gas liquefaction train 100 includes a main heat exchanger 102 having a warm end 104, a cold end 106, and a mid-point 108. The wall of the main heat exchanger 102 defines a shell 110. Within the shell 110, a first path 112 conducts the methane-rich feed gas and extends from the warm end 104 to the cold end 106 of the heat exchanger 102. Also, a second path 114 conducts a heavy refrigerant and extends from the warm end 104 to the midpoint 108 of the heat exchanger 102. In addition, a third path 116 conducts a light refrigerant and extends from the warm end 104 to the cold end 106 of the heat exchanger 102.

During normal operation, a gaseous methane-rich feed is supplied at elevated pressure through a supply conduit 118 to the first path 112 of the main heat exchanger 102 at its warm end 104. The feed gas passes through the first path 112 and is cooled, liquefied, and sub-cooled against refrigerant evaporating in the shell 110 of the heat exchanger 102. The resulting liquefied natural gas stream is removed from the first path 112 of the main heat exchanger 102 at its cold end 106 through a conduit 120. The liquefied stream is passed to a nitrogen cooling loop for additional cooling and then stored as a liquefied product.

Evaporated refrigerant is removed from the shell 110 of the main heat exchanger 102 at its warm end 104 through a conduit 122. A compressor 124 compresses the evaporated refrigerant to produce high-pressure refrigerant that is released through a conduit 126. The compressor 124 is driven by a motor 128, such as a gas turbine. The motor 128 could be provided with an auxiliary starting device.

The refrigerant at high pressure in the conduit 126 is cooled in an air cooler 130 and partly condensed in a heat exchanger 132 to become partly condensed refrigerant. The air cooler 130 could be replaced by a heat exchanger in which the refrigerant is cooled against water (such as seawater).

In the heat exchanger 132, heat is removed from the high-pressure refrigerant by means of indirect heat exchange with an auxiliary refrigerant (such as propane) evaporating at a suitable pressure in the shell of the heat exchanger 132. Evaporated auxiliary refrigerant is then compressed in a compressor 134, such as a propane compressor. The compressor 134 can be driven by a motor 136, such as a gas turbine. The auxiliary refrigerant is condensed in an air cooler 138, where air is the external coolant. Condensed auxiliary refrigerant at an elevated pressure is passed through a conduit 140 provided with an expansion valve 142 into the shell of the heat exchanger 132. The condensed auxiliary refrigerant is allowed to evaporate at low pressure in the heat exchanger 132, and evaporated auxiliary refrigerant is returned to the compressor 134. It is understood that a plurality of compressors can be employed, which may be arranged in parallel or in series. Also, in this example, the air cooler 138 can be replaced by a heat exchanger in which the auxiliary refrigerant is cooled against water (such as seawater).

The high-pressure refrigerant provided by the heat exchanger 132 is introduced through an inlet device into a separator in the form of a separator vessel 144. In the separator vessel 144, the partly condensed refrigerant is separated into a liquid heavy refrigerant fraction and a gaseous light refrigerant fraction. The liquid heavy refrigerant fraction is removed from the separator vessel 144 through a conduit 146, and the gaseous light refrigerant fraction is removed through a conduit 148.

The heavy refrigerant fraction from the conduit 146 is sub-cooled in the second path 114 of the main heat exchanger 102 to produce a sub-cooled heavy refrigerant stream. The sub-cooled heavy refrigerant stream is removed from the main heat exchanger 102 through a conduit 150 and allowed to expand over an expansion device in the form of an expansion valve 152. At reduced pressure, the sub-cooled heavy refrigerant stream is introduced through a conduit 154 and a nozzle 156 into the shell 110 of the main heat exchanger 102 at its mid-point 108. The heavy refrigerant stream is allowed to evaporate in the shell 110 at reduced pressure, thereby cooling the fluids in the paths 112-116.

The gaseous light refrigerant fraction from the conduit 148 is passed to the third path 116 in the main heat exchanger 102 where it is cooled, liquefied, and sub-cooled to produce a sub-cooled light refrigerant stream. The sub-cooled light refrigerant stream is removed from the main heat exchanger 102 through a conduit 158 and allowed to expand over an expansion device in the form of an expansion valve 160. At reduced pressure, the sub-cooled light refrigerant stream is introduced through a conduit 162 and a nozzle 164 into the shell 110 of the main heat exchanger 102 at its cold end 106. The light refrigerant stream is allowed to evaporate in the shell 110 at reduced pressure, thereby cooling the fluids in the paths 112-116.

As noted above, a liquefied natural gas stream is removed from the main heat exchanger 102 through the conduit 120. The liquefied natural gas stream is allowed to expand over an expansion device in the form of an expansion valve 166. The liquefied natural gas stream then enters a nitrogen cooling loop that further cools the liquefied natural gas stream. In this example, the nitrogen cooling loop includes a heat exchanger 168 having a single path 170 and having a warm end 172 and a cold end 174. A refrigerant (nitrogen) enters the heat exchanger 168 at its cold end 174 and exits the heat exchanger 168 at its warm end 172. The evaporation of the nitrogen in the heat exchanger 168 further cools the liquefied natural gas stream.

In this example, nitrogen is removed from the heat exchanger 168 at its warm end 172 through a conduit 176. A compressor 178 compresses the nitrogen to produce high-pressure refrigerant that is released through a conduit 180. The compressor 178 can be driven by a motor 182, such as a gas turbine. The motor 182 could be provided with an auxiliary starting device. As a particular example, the motor 182 could operate using propane to deliver nitrogen at high enough pressure and low enough temperature to the heat exchanger 168.

The high-pressure nitrogen is allowed to expand over an expansion device in the form of an expansion valve 186. At reduced pressure, the nitrogen is introduced through a conduit 188 into the heat exchanger 168 at its cold end 174.

The liquefied natural gas stream exiting the heat exchanger 168 is passed through a conduit 190. The conduit 190 is provided with an expansion device in the form of an expansion valve 192 to reduce the pressure of the liquefied natural gas stream. This allows the resulting liquefied natural gas stream to be introduced via an inlet device into a flash vessel 194 at a reduced pressure. In some embodiments, the reduced pressure is substantially equal to atmospheric pressure. The expansion valve 192 also regulates the total flow of liquefied natural gas. Off-gas can be removed from the flash vessel 194 through a conduit 196. The off-gas can be compressed in an end-flash compressor to produce a high-pressure fuel gas, such as a fuel gas used by gas turbines in the train 100. Liquefied natural gas product can be removed from the flash vessel 194 through a conduit 198 and passed to storage.

The use of the nitrogen cooling loop in the liquefaction train 100 may help to provide additional cooling to the liquefied natural gas. For example, the nitrogen cooling loop could provide an additional cooling of up to 30° C. or more to the liquefied natural gas stream (beyond the cooling provided by the main heat exchanger 102). This means, for instance, that the ethane content of the liquefied natural gas stream can be lowered. This typically lowers the calorific value/heating value of the liquefied natural gas. Moreover, the liquefied natural gas could be enriched with ethane later if necessary, or the recovered ethane can be sold as a by-product of the liquefaction process.

Although FIG. 1 illustrates one example of a natural gas liquefaction train 100, various changes may be made to FIG. 1. For example, other or additional equipment could be used in any suitable configuration or arrangement to produce liquefied natural gas. As a particular example, the nitrogen cooling loop could be used to provide additional cooling to liquefied natural gas produced by any other suitable process.

Figure 2:
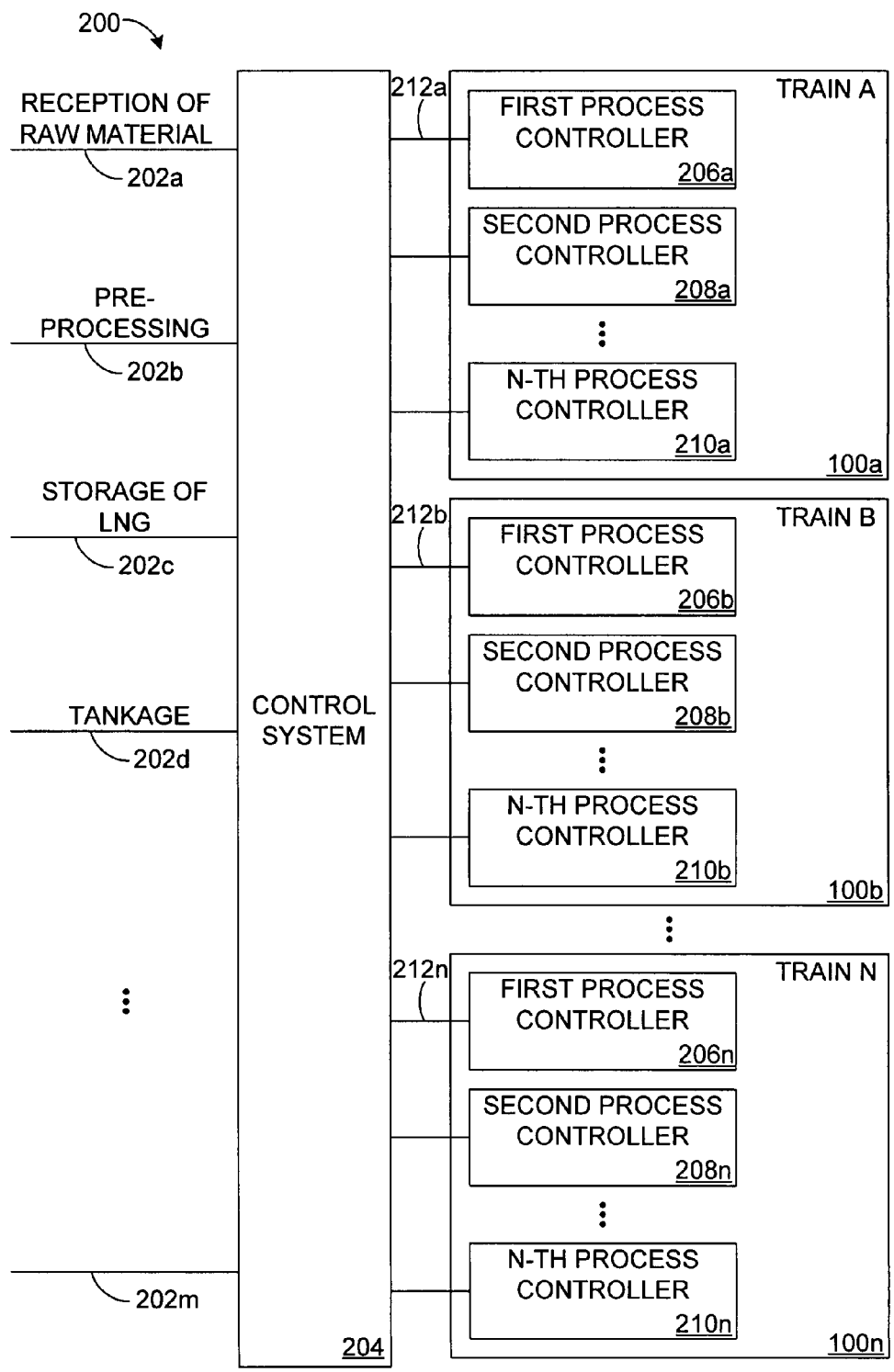
FIG. 2 illustrates an example control scheme for controlling a liquefied natural gas facility in accordance with this disclosure.

FIG. 2 illustrates an example control scheme 200 for controlling a liquefied natural gas facility in accordance with this disclosure. The embodiment of the control scheme 200 shown in FIG. 2 is for illustration only. Other embodiments of the control scheme 200 may be used without departing from the scope of this disclosure.

In this example, the liquefied natural gas facility includes one or multiple natural gas liquefaction trains $100a$-$100n$. Each of the natural gas liquefaction trains $100a$-$100n$ could be the same as or similar to the natural gas liquefaction train 100 shown in FIG. 1. The facility could include any suitable number of liquefaction trains.

The diagram in FIG. 2 also illustrates various processes $202a$-$202m$ of the facility. These processes may include front-end processes such as reception of raw material $202a$ and pre-processing of the raw material $202b$. These processes may also include back-end processes such as storage of the liquefied natural gas $202c$ and tankage of the liquefied natural gas $202d$. These various processes may be controlled by a control system 204, such as a dynamic optimization tool. The control system 204 may globally optimize associated processes within a process facility. This allows the control system 204 to provide global optimization of a facility, which may help to ensure that a holistic optimum is approached during operation of the facility.

As shown in FIG. 2, additional process controllers can be provided for each of the natural gas liquefaction trains $100a$-$100n$. For example, each liquefaction train could include multiple process controllers. In FIG. 2, the train $100a$ includes process controllers $206a$, $208a$, and $210a$. Also, the train $100b$ includes process controllers $206b$, $208b$, and $210b$. In addition, the train $100n$ includes process controllers $206n$, $208n$, and $210n$. Each controller or control system includes any suitable hardware, software, firmware, or combination thereof for controlling part or all of a natural gas facility. Each controller or control system could, for example, include one or more processors and one or more memories storing instructions and data used, generated, or collected by the processor(s).

In this example embodiment, each of the controllers associated with a single process train $100a$-$100n$ can perform a subset of the entire control solution used to control that particular process train. Also, the controllers associated with a single process train $100a$-$100n$ can be coordinated and optimized by the control system 204. For instance, the control system 204 could generate control signals that are provided to the various controllers $206a$-$206n$, $208a$-$208n$, and $210a$-$210n$, where the control signals control or alter how these controllers operate.

In this example, optimized values $212a$-$212n$ are provided to the first process controllers $206a$-$206n$ of the trains $100a$-$100n$. The first process controller in each train may set and control the mass flow rate of the methane-rich feed gas for that particular train. A change in the mass flow rate of the methane-rich feed gas for a train may influence the conditions in the main heat exchanger 102 of that train so as to have, for example, an effect on the temperature in the main heat exchanger 102. The second process controllers $208a$-$208n$ of the trains $100a$-$100n$ may control the refrigerant loops in the trains, such as by using model predictive control to control the supply of refrigerants to the heat exchangers 102 and 168. The third process controllers $210a$-$210n$ of the trains $100a$-$100n$ may control one or multiple additional areas or processes, such as fractionation or acid gas removal.

During normal operation of the facility (and therefore during normal operation of the trains $100a$-$100n$), the process within each train $100a$-$100n$ can be controlled so that the trains $100a$-$100n$ are operated in the most efficient way. For example, each of the trains $100a$-$100n$ can be controlled so that a maximum output of liquefied natural gas is achieved using a minimum of employed power for supplying the various compressors and other components in the train. This can be achieved, for instance, by driving the compressors at an optimum operating point. As an example, when the capacity of tanks for storing the liquefied natural gas is exhausted or there is an increased need for liquefied natural gas, the control system 204 is able to send optimization solutions to the first process controllers $206a$-$206n$. Each first process controller then sets the flow rate of the methane-rich feed gas for its train to a value in accordance with the optimization solution it receives.

The control system 204 may indicate, for example, that the amount of liquefied natural gas for a certain train should be decreased. The first process controller of that train may set the flow rate of the methane-rich feed gas to a lower level. As a result, the temperature of the first path 112 of the main heat exchanger 102 in that train may decrease due to a smaller supply of relatively warm feed. The second process controller of that train may detect the lower temperature in the main heat exchanger 102 and react to this disturbance. For example, in order to compensate for the disturbance, the supply and/or composition (such as the ratio of heavy and light refrigerants) of refrigerant provided to the main heat exchanger 102 can be adapted so as to maintain the required temperature differences in the main heat exchanger 102 for liquefying the newly set stream of natural gas.

If more liquefied natural gas is requested by the control system 204 than the present operational mode of a certain train would produce, a respective optimization solution can be provided to the first process controller in that train. The first process controller in turn increases the flow rate of the methane-rich feed gas in the train. The increased flow of the relatively warm feed gas may increase the temperature in the first path 112 of the main heat exchanger 102. This can be detected by the second process controller as a disturbance. In order to maintain the required conditions in the main heat exchanger 102 suitable for liquefying natural gas, the supply and/or composition of refrigerant to the main heat exchanger 102 can be adapted by the second process controller.

If fluctuations occur when raw material is received (such as from an offshore pipeline), the control system 204 may detect the increase, decrease, or change of raw material flow or composition. The control system 204 may also calculate and send respective optimization solutions to the first process controllers $206a$-$206n$ automatically. The first process controllers $206a$-$206n$ can, for example, react to the increased or decreased availability of raw material and adapt the positions of valves responsible for controlling the flow rate of the methane-rich feed gas in the trains $100a$-$100n$.

As these examples illustrate, this allows the liquefaction process to be operated within the facility in an efficient way. For example, no manual adjustments of the model predictive control of the second process controllers $208a$-$208n$ may be required.

Although FIG. 2 illustrates one example of a control scheme 200 for controlling a liquefied natural gas facility, various changes may be made to FIG. 2. For example, the functional division shown in FIG. 2 is for illustration only.

Various components in FIG. 2 could be combined or omitted and additional components could be added according to particular needs. Also, various controllers and control systems in FIG. 2 could be combined, omitted, or further subdivided. As a particular example, various controllers and control systems in FIG. 2 could be implemented on a single platform or on multiple platforms.

Figure 3:
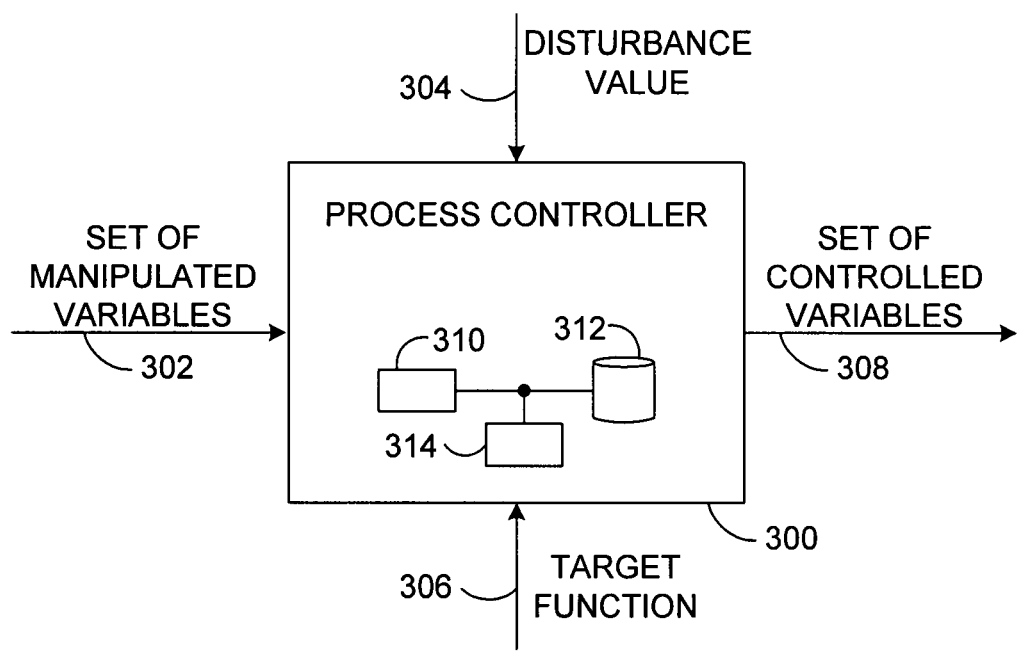
FIG. 3 illustrates an example process controller for controlling a natural gas liquefaction train in accordance with this disclosure.

FIG. 3 illustrates an example process controller 300 for controlling a natural gas liquefaction train in accordance with this disclosure. The process controller 300 in FIG. 3 could, for example, represent the second process controllers 208a-208n in the control scheme 200 shown in FIG. 2. The embodiment of the process controller 300 shown in FIG. 3 is for illustration only. Other embodiments of the process controller 300 may be used without departing from the scope of this disclosure.

In this example, the process controller 300 receives values associated with a set of manipulated variables 302, a disturbance value 304, and a target function 306 as inputs. The process controller 300 generates values associated with a set of controlled variables 308 as outputs. In general, the facility or process being controlled by the controller 300 is associated with various "process variables," which represent various aspects of the facility or process (such as flow rate, temperature, pressure, or volume). The controller 300 may operate by attempting to maintain a "controlled variable" (CV) at or near a desired value or within a desired operating range. The desired value or desired operating range may be defined by the target function 306. The controller 300 attempts to maintain the controlled variable by altering one or more "manipulated variables" (MVs), such as an opening of a valve or a speed of a turbine. A "disturbance value" (DV) represents a value that affects a controlled variable, where the disturbance value can be considered by the controller 300 when altering the manipulated variables but generally cannot be controlled by the controller 300 (such as a disturbance in the mass flow rate of the methane-rich feed gas). By controlling certain controlled variables, the controller 300 may optimize the production process performed by the facility or process.

To control the nitrogen cooling loop in a liquefaction train, the controller 300 could use the following manipulated variable:
  the nitrogen flow to the heat exchanger 168 (which can be adjusted, for example, by altering the operation of the compressor 178, such as its speed or suction pressure).
The controller 300 could use this manipulated variable to control one or more of the following controlled variables:
  the rundown temperature of the natural gas stream exiting the heat exchanger 168; and
  the calorific value of the natural gas stream exiting the heat exchanger 168.
To control the main cooling loop (the main heat exchanger 102) in a liquefaction train, the controller 300 could use one or more of the following manipulated variables:
  the mass flow of the light refrigerant; and
  the mass flow of the heavy refrigerant.
The controller 300 could use one or more of these manipulated variables to control one or more of the following controlled variables:
  a temperature difference between the fluid in the first path 112 of the main heat exchanger 102 and the fluid in the shell 110 of the main heat exchanger 102 at its warm end 104;
  a temperature difference between the fluid in the first path 112 of the main heat exchanger 102 and the fluid in the shell 110 of the main heat exchanger 102 at its cold end 106; and
  a temperature difference between the fluid in the first path 112 of the main heat exchanger 102 and the fluid in the shell 110 of the main heat exchanger 102 at its mid-point 108.

When controlling one or more of these controlled variables using one or more of these manipulated variables, the controller 300 could operate to optimize the compensation of a disturbance caused by the mass flow of the methane-rich feed gas. For example, the process controller 300 may react to the disturbance value 304 obtained by a change in temperature. That is, the process controller 300 may be adapted to set or adjust the manipulated variables 302 so as to maintain desired temperature differences (the controlled variables 308) in order to obtain the necessary conditions for suitably liquefying the methane-rich feed gas. The disturbance value 304, which may be caused by a change of the mass flow rate of the methane-rich feed gas and thus a change of the temperature in the main heat exchanger 102, is compensated for by the controller 300.

As noted above, the controller 300 could operate using model predictive control. In these embodiments, the controller 300 may use one or more models to determine how to adjust one or more manipulated variables to obtain desired values for one or more controlled variables. These models could be generated, for example, using step-test data involving various equipment in a natural gas liquefaction train. Table 1 identifies example models that could associate certain controlled variables to certain manipulated variables. The models in Table 1 are shown in Laplace Transform form.

TABLE 1

| Manipulated Variable-Controlled Variable Combination | Model |
|---|---|
| Nitrogen flow in nitrogen cooling loop-Final LNG temperature of LNG exiting nitrogen cooling loop | $G(s) = -0.979 \dfrac{1}{1.29s + 1} e^{-0s}$ |
| Nitrogen flow in nitrogen cooling loop-Final LNG calorific value of LNG exiting nitrogen cooling loop | $G(s) = -0.687 \dfrac{1}{1.78s + 1} e^{-0s}$ |
| Compressor pressure of compressor 124-Temperature difference between fluid in first path 112 of heat exchanger 102 and fluid in shell 110 of heat exchanger 102 at cold end 106 | $G(s) = 0.7 \dfrac{1}{5s + 1} e^{-0s}$ |
| Compressor pressure of compressor 124-Temperature difference between fluid in first path 112 of heat exchanger 102 and fluid in shell 110 of heat exchanger 102 at mid-point 108 | $G(s) = 0.55 \dfrac{1}{5.71s + 1} e^{-3s}$ |
| Compressor pressure of compressor 124-Temperature difference between fluid in first path 112 of heat exchanger 102 and fluid in shell 110 of heat exchanger 102 at warm end 104 | $G(s) = -0.2 \dfrac{414s + 1}{641s^2 + 45s + 1} e^{-9s}$ |
| Flow of refrigerant from compressor 124-Temperature difference between fluid in first path 112 of heat exchanger 102 and fluid in shell 110 of heat exchanger 102 at cold end 106 | $G(s) = -0.1 \dfrac{1}{15s + 1} e^{-0s}$ |

TABLE 1-continued

| Manipulated Variable-Controlled Variable Combination | Model |
|---|---|
| Flow of refrigerant from compressor 124-Temperature difference between fluid in first path 112 of heat exchanger 102 and fluid in shell 110 of heat exchanger 102 at mid-point 108 | $G(s) = 0.0404 \dfrac{1}{80.5s^2 + 17.9s + 1} e^{-6s}$ |
| Flow of refrigerant from compressor 124-Temperature difference between fluid in first path 112 of heat exchanger 102 and fluid in shell 110 of heat exchanger 102 at warm end 104 | $G(s) = 0.129 \dfrac{1}{35.3s + 1} e^{-0s}$ |

Using these models, the controller 300 can more effectively control one or more of the controlled variables through adjustments to one or more of the manipulated variables. The controller 300 can, for example, optimize the operation of the liquefaction train 100 using these models. The models shown in Table 1 are for illustration only. Any other suitable models could be defined and used by the controller 300.

The controller 300 includes any suitable hardware, software, firmware, or combination thereof for controlling part or all of a natural gas liquefaction train. In this example, the controller 300 includes one or more processors 310, one or more memories 312, and a network interface 314. The one or more processors 310 represent any suitable processing or computing device(s), such as a microprocessor or microcontroller. The one or more memories 312 represent one or more volatile and/or non-volatile storage and retrieval devices for storing instructions and data used, generated, or collected by the processor(s) 310. This data may include one or more models identifying how manipulated variables can be used to control controlled variables. The network interface 314 supports communication with external components, such as higher-level control or supervisory functions (like the control system 204). As a particular example, the network interface 314 could represent an Ethernet interface.

Although FIG. 3 illustrates one example of a process controller 300 for controlling a natural gas liquefaction train, various changes may be made to FIG. 3. For example, the controller 300 could include any other or additional components according to particular needs. Also, while shown as being formed using a computer processing device, the controller 300 could be implemented in any other suitable manner. In addition, the details provided above (such as the identification of particular controlled, manipulated, and disturbance variables and models) are examples only. The controller 300 could operate using any other suitable variables and/or models.

Figure 4:
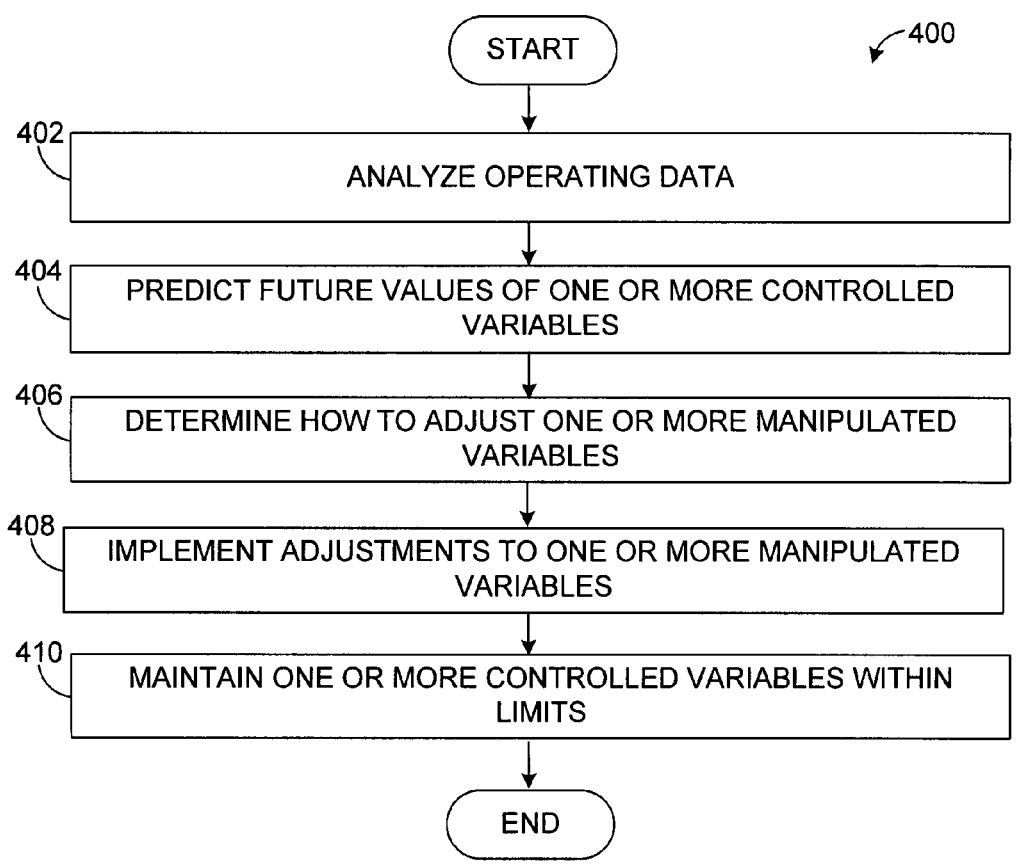
FIG. 4 illustrates an example method for controlling a natural gas liquefaction train in accordance with this disclosure.

FIG. 4 illustrates an example method 400 for controlling a natural gas liquefaction train in accordance with this disclosure. The embodiment of the method 400 shown in FIG. 4 is for illustration only. Other embodiments of the method 400 could be used without departing from the scope of this disclosure. Also, for ease of explanation, the method 400 is described with respect to the controller 300 of FIG. 3 controlling the liquefaction train 100 of FIG. 1. The method 400 could be used by any other device or system to control any suitable production equipment.

Operating data is analyzed at step 402. This could include, for example, the controller 300 receiving data identifying how one or more controlled, manipulated, or disturbance variables are behaving during operation of the liquefaction train 100. The data could be stored in a database or other repository.

The controller predicts future values of one or more controlled variables at step 404. This may include, for example, the controller 300 analyzing past and current data regarding the controlled variables to estimate the future values of the controlled variables at some future point in time. As a particular example, this could include the controller 300 estimating the future values of the rundown temperature and the calorific value/heating value of the liquefied natural gas stream exiting the heat exchanger 168.

The controller determines how to adjust one or more manipulated variables at step 406. This may include, for example, the controller 300 using one or more models to determine how to adjust the one or more manipulated variables. As a particular example, this could include the controller 300 determining how to adjust the nitrogen flow associated with the heat exchanger 168 to maintain the rundown temperature and the calorific value/heating value of the liquefied natural gas stream exiting the heat exchanger 168 at a desired value or within a desired range.

The controller implements the adjustments to the one or more manipulated variables at step 408. This may include, for example, the controller 162 outputting control signals to adjust valves and other components in the liquefaction train 100. As a particular example, this could include the controller 300 adjusting the nitrogen flow associated with the heat exchanger 168, such as by altering the speed or suction pressure of the compressor 178.

In this way, the controller is able to maintain the one or more controlled variables within their specified limits at step 410. This may include, for example, the controller 300 continuing to adjust the nitrogen flow so that the rundown temperature and the calorific value/heating value of the liquefied natural gas stream stay within their limits.

Although FIG. 4 illustrates one example of a method 400 for controlling a natural gas liquefaction train, various changes may be made to FIG. 4. For example, while shown as a series of steps, various steps in FIG. 4 could overlap. Also, various steps in FIG. 4 could be repeated, such as when the controller 300 performs steps 402-408 at a specified interval.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely. The terms "warm" and "cold" refer to relative temperatures and need not denote or imply actual temperatures or ranges of temperatures.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
    at least one memory configured to store a plurality of models, the models associated with manipulated variables and controlled variables, the manipulated variables and the controlled variables associated with a natural gas liquefaction train that comprises:
        a first heat exchanger configured to cool a natural gas stream into a liquefied natural gas stream;
        a compressor configured to compress evaporated refrigerant from a shell of the first heat exchanger;
        an expansion valve configured to receive the liquefied natural gas stream after the liquefied natural gas stream exits the first heat exchanger and cause the liquefied natural gas stream to expand; and
        a nitrogen cooling loop configured to receive the liquefied natural gas stream after the liquefied natural gas stream exits the expansion value and further cool the liquefied natural gas stream, the nitrogen cooling loop comprising a second heat exchanger having a single path; and
    at least one processor configured to determine how to adjust the manipulated variables using the models so as to control the controlled variables;
    wherein the manipulated variables comprise a nitrogen flow to the second heat exchanger of the nitrogen cooling loop, a compressor pressure of the compressor, and a flow of compressed refrigerant from the compressor;
    wherein the controlled variables comprise a calorific value of the liquefied natural gas stream exiting the second heat exchanger of the nitrogen cooling loop, a rundown temperature of the liquefied natural gas stream exiting the second heat exchanger of the nitrogen cooling loop, and temperature differences within the first heat exchanger, the temperature differences associated with the evaporated refrigerant;
    wherein the models comprise a first model associating the nitrogen flow to the second heat exchanger of the nitrogen cooling loop and the rundown temperature of the liquefied natural gas stream exiting the second heat exchanger of the nitrogen cooling loop, and a second model associating the nitrogen flow to the second heat exchanger of the nitrogen cooling loop and the calorific value of the liquefied natural gas stream exiting the second heat exchanger of the nitrogen cooling loop; and
    wherein the at least one processor is configured to use the first and second models to determine how to manipulate the nitrogen flow in order to control the calorific value and the temperature of the liquefied natural gas stream exiting the second heat exchanger of the nitrogen cooling loop.

2. The apparatus of claim 1, wherein the further cooling of the liquefied natural gas stream by the nitrogen cooling loop results in a lower ethane content in the liquefied natural gas stream.

3. The apparatus of claim 1, wherein the at least one processor is configured to adjust operation of a second compressor associated with the nitrogen cooling loop to adjust the nitrogen flow.

4. The apparatus of claim 3, wherein the at least one processor is configured to adjust at least one of a speed and a suction pressure of the second compressor.

5. The apparatus of claim 1, wherein the temperature differences within the first heat exchanger comprise a first temperature difference between a fluid in a first path of the first heat exchanger and the evaporated refrigerant in the shell of the first heat exchanger at a warm end of the first heat exchanger, the first path configured to receive a feed gas and output liquefied natural gas.

6. The apparatus of claim 1, wherein:
    the first heat exchanger is associated with a light refrigerant and a heavy refrigerant that are produced by separating the compressed refrigerant; and
    the manipulated variables further comprise a mass flow of the light refrigerant and a mass flow of the heavy refrigerant.

7. The apparatus of claim 1, wherein the at least one processor is configured to determine how to manipulate the compressor pressure of the compressor and the flow of compressed refrigerant from the compressor in order to control:
    a first temperature difference between a fluid in a first path of the first heat exchanger and the evaporated refrigerant in the shell of the first heat exchanger at a warm end of the first heat exchanger, the first path configured to receive a feed gas and output liquefied natural gas;
    a second temperature difference between the fluid in the first path of the first heat exchanger and the evaporated refrigerant in the shell of the first heat exchanger at a cold end of the first heat exchanger; and
    a third temperature difference between the fluid in the first path of the first heat exchanger and the evaporated refrigerant in the shell of the first heat exchanger at a midpoint of the first heat exchanger.

8. A method comprising:
    determining how to adjust manipulated variables so as to control controlled variables using a plurality of models, the manipulated variables and the controlled variables associated with a natural gas liquefaction train that comprises:
        a first heat exchanger configured to cool a natural gas stream into a liquefied natural gas stream;
        a compressor configured to compress evaporated refrigerant from a shell of the first heat exchanger;
        an expansion valve configured to receive the liquefied natural gas stream after the liquefied natural gas stream exits the first heat exchanger and cause the liquefied natural gas stream to expand; and
        a nitrogen cooling loop configured to receive the liquefied natural gas stream after the liquefied natural gas stream exits the expansion value and further cool the liquefied natural gas stream, the nitrogen cooling loop comprising a second heat exchanger having a single path; and outputting control signals for manipulating the manipulated variables to control the controlled variables based on the determination;

wherein the manipulated variables comprise a nitrogen flow to the second heat exchanger of the nitrogen cooling loop, a compressor pressure of the compressor, and a flow of compressed refrigerant from the compressor;

wherein the controlled variables comprise a calorific value of the liquefied natural gas stream exiting the second heat exchanger of the nitrogen cooling loop, a rundown temperature of the liquefied natural gas stream exiting the second heat exchanger of the nitrogen cooling loop, and temperature differences within the first heat exchanger, the temperature differences associated with the evaporated refrigerant;

wherein the models comprise a first model associating the nitrogen flow to the second heat exchanger of the nitrogen cooling loop and the rundown temperature of the liquefied natural gas stream exiting the second heat exchanger of the nitrogen cooling loop, and a second model associating the nitrogen flow to the second heat exchanger of the nitrogen cooling loop and the calorific value of the liquefied natural gas stream exiting the second heat exchanger of the nitrogen cooling loop; and wherein outputting the control signals comprises outputting at least one first control signal to manipulate the nitrogen flow in order to control the calorific value and the temperature of the liquefied natural gas stream exiting the second heat exchanger of the nitrogen cooling loop.

9. The method of claim 8, wherein the further cooling of the liquefied natural gas stream by the nitrogen cooling loop results in a lower ethane content in the liquefied natural gas stream.

10. The method of claim 8, wherein outputting the at least one first control signal comprises outputting the at least one first control signal for adjusting operation of a second compressor associated with the nitrogen cooling loop to adjust the nitrogen flow.

11. The method of claim 8, wherein the temperature differences within the first heat exchanger comprise a first temperature difference between a fluid in a first path of the first heat exchanger and the evaporated refrigerant in the shell of the first heat exchanger at a warm end of the first heat exchanger, the first path configured to receive a feed gas and output liquefied natural gas.

12. The method of claim 8, wherein:
the first heat exchanger is associated with a light refrigerant and a heavy refrigerant that are produced by separating the compressed refrigerant; and
the manipulated variables further comprise a mass flow of the light refrigerant and a mass flow of the heavy refrigerant.

13. The method of claim 8, wherein outputting the control signals further comprises outputting at least one second control signal to manipulate the compressor pressure of the compressor and the flow of compressed refrigerant from the compressor in order to control:
a first temperature difference between a fluid in a first path of the first heat exchanger and the evaporated refrigerant in the of the first heat exchanger at a warm end of the first heat exchanger, the first path configured to receive a feed gas and output liquefied natural gas;

a second temperature difference between the fluid in the first path of the first heat exchanger and the evaporated refrigerant in the shell of the first heat exchanger at a cold end of the first heat exchanger; and
a third temperature difference between the fluid in the first path of the first heat exchanger and the evaporated refrigerant in the shell of the first heat exchanger at a midpoint of the first heat exchanger.

14. A non-transitory computer readable medium embodying a computer program, the computer program comprising:
computer readable program code for determining how to adjust manipulated variables so as to control controlled variables using a plurality of models, the manipulated variables and the controlled variables associated with a natural gas liquefaction train that comprises:
a first heat exchanger configured to cool a natural gas stream into a liquefied natural gas stream;
a compressor configured to compress evaporated refrigerant from a shell of the first heat exchanger;
an expansion valve configured to receive the liquefied natural gas stream after the liquefied natural gas stream exits the first heat exchanger and cause the liquefied natural gas stream to expand; and
a nitrogen cooling loop configured to receive the liquefied natural gas stream after the liquefied natural gas stream exits the expansion value and further cool the liquefied natural gas stream, the nitrogen cooling loop comprising a second heat exchanger having a single path; and
computer readable program code for generating control signals for manipulating the manipulated variables to control the controlled variables based on the determination;
wherein the manipulated variables comprise a nitrogen flow to the second heat exchanger of the nitrogen cooling loop, a compressor pressure of the compressor, and a flow of compressed refrigerant from the compressor;
wherein the controlled variables comprise a calorific value of the liquefied natural gas stream exiting the second heat exchanger of the nitrogen cooling loop, a rundown temperature of the liquefied natural gas stream exiting the second heat exchanger of the nitrogen cooling loop, and temperature differences within the first heat exchanger, the temperature differences associated with the evaporated refrigerant;
wherein the models comprise a first model associating the nitrogen flow to the second heat exchanger of the nitrogen cooling loop and the rundown temperature of the liquefied natural gas stream exiting the second heat exchanger of the nitrogen cooling loop, and a second model associating the nitrogen flow to the second heat exchanger of the nitrogen cooling loop and the calorific value of the liquefied natural gas stream exiting the second heat exchanger of the nitrogen cooling loop; and
wherein the computer readable program code for outputting the control signals comprises computer readable program code for outputting at least one first control signal to manipulate the nitrogen flow in order to control the calorific value and the temperature of the liquefied natural gas stream exiting the nitrogen cooling loop.

15. The computer readable medium of claim 14, wherein:
the controlled variables further comprise a rundown temperature of the liquefied natural gas stream exiting the nitrogen loop.

16. The computer readable medium of claim 15, wherein the computer readable program code for outputting the at least one first control signal comprises computer readable program code for outputting the at least one first control signal to adjust operation of a second compressor associated with the nitrogen cooling loop in order to adjust the nitrogen flow.

17. The computer readable medium of claim 14, wherein the manipulated variables further comprise a mass flow of a light refrigerant associated with the first heat exchanger and a mass flow of a heavy refrigerant associated with the first heat exchanger.

18. A system comprising:
a plurality of controllers configured to control operation of a natural gas liquefaction train that comprises:
    a first heat exchanger configured to cool a natural gas stream into a liquefied natural gas stream;
    a compressor configured to compress evaporated refrigerant from a shell of the first heat exchanger;
    an expansion valve configured to receive the liquefied natural gas stream after the liquefied natural gas stream exits the first heat exchanger and cause the liquefied natural gas stream to expand; and
    a nitrogen cooling loop configured to receive the liquefied natural gas stream after the liquefied natural gas stream exits the expansion value and further cool the liquefied natural gas stream, the nitrogen cooling loop comprising a second heat exchanger having a single path;
wherein a first of the controllers is configured to determine how to adjust manipulated variables associated with the natural gas liquefaction train so as to control controlled variables associated with the natural gas liquefaction train using a plurality of models;
wherein the manipulated variables comprises a nitrogen flow to the second heat exchanger of the nitrogen cooling loop, a compressor pressure of the compressor, and a flow of compressed refrigerant from the compressor;
wherein the controlled variables comprise a calorific value of the liquefied natural gas stream exiting the second heat exchanger of the nitrogen cooling loop, a rundown temperature of the liquefied natural gas stream exiting the second heat exchanger of the nitrogen cooling loop, and temperature differences within the first heat exchanger, the temperature differences associated with the evaporated refrigerant;
wherein the models comprise a first model associating the nitrogen flow to the second heat exchanger of the nitrogen cooling loop and the rundown temperature of the liquefied natural gas stream exiting the second heat exchanger of the nitrogen cooling loop, and a second model associating the nitrogen flow to the second heat exchanger of the nitrogen cooling loop and the calorific value of the liquefied natural gas stream exiting the second heat exchanger of the nitrogen cooling loop; and
wherein the first controller is configured to determine how to manipulate the nitrogen flow in order to control the calorific value and the temperature of the liquefied natural gas stream exiting the nitrogen cooling loop.

19. The system of claim 18, wherein the temperature differences within the first heat exchanger comprise a first temperature difference between a fluid in a first path of the first heat exchanger and the evaporated refrigerant in the shell of the first heat exchanger at a warm end of the first heat exchanger, the first path configured to receive a feed gas and output liquefied natural gas.

20. The system of claim 18, wherein the manipulated variables further comprise a mass flow of a light refrigerant associated with the first heat exchanger and a mass flow of a heavy refrigerant associated with the first heat exchanger.

21. The system of claim 18, wherein a second of the controllers is configured to control a mass flow rate of a feed gas in the natural gas liquefaction train.

22. The apparatus of claim 7, wherein the models further comprise:
    a third model associating the compressor pressure of the compressor and the first temperature difference;
    a fourth model associating the compressor pressure of the compressor and the second temperature difference;
    a fifth model associating the compressor pressure of the compressor and the third temperature difference;
    a sixth model associating the flow of compressed refrigerant from the compressor and the first temperature difference;
    a seventh model associating the flow of compressed refrigerant from the compressor and the second temperature difference;
    an eighth model associating the flow of compressed refrigerant from the compressor and the third temperature difference.

23. The apparatus of claim 22, wherein:
the first model is defined in Laplace Transform form as $$G(s) = -0.979 \frac{1}{1.29s+1} e^{-0s};$$

the second model is defined in Laplace Transform form as $$G(s) = -0.687 \frac{1}{1.78s+1} e^{-0s};$$

the third model is defined in Laplace Transform form as $$G(s) = -0.2 \frac{414s+1}{641s^2+45s+1} e^{-9s};$$

the fourth model is defined in Laplace Transform form as $$G(s) = 0.7 \frac{1}{5s+1} e^{-0s};$$

the fifth model is defined in Laplace Transform form as $$G(s) = 0.55 \frac{1}{5.71s+1} e^{-3s};$$

the sixth model is defined in Laplace Transform form as $$G(s) = 0.129 \frac{1}{35.3s+1} e^{-0s};$$

the seventh model is defined in Laplace Transform form as $$G(s) = -0.1 \frac{1}{15s+1} e^{-0s};$$

and
the eighth model is defined in Laplace Transform form as $$G(s) = 0.0404 \frac{1}{80.5s^2+17.9s+1} e^{-6s}.$$

* * * * *